(12) United States Patent
Masberg et al.

(10) Patent No.: US 6,483,197 B1
(45) Date of Patent: Nov. 19, 2002

(54) DRIVE SYSTEM, ELECTRIC MACHINE FOR USE IN A DRIVE SYSTEM, AND METHOD FOR OPERATING AN ELECTRIC MACHINE IN A DRIVE SYSTEM

(75) Inventors: Ullrich Masberg, Rösrath; Thomas Pels, Achern; Klaus-Peter Zeyen, Köln; Andreas Gründl, München; Bernhard Hoffmann, Starnberg, all of (DE)

(73) Assignee: Continental ISAD Electronic Systems GmbH & Co., KG, Landsberg (DE)

( * ) Notice: Subject to any disclaimer, the term of this patent is extended or adjusted under 35 U.S.C. 154(b) by 0 days.

(21) Appl. No.: 09/388,990

(22) Filed: Jun. 29, 1999

Related U.S. Application Data

(63) Continuation of application No. 09/043,686, filed as application No. PCT/DE96/01664 on Aug. 31, 1996.

(30) Foreign Application Priority Data

Aug. 31, 1995 (DE) ......................................... 195 32 135
Aug. 31, 1995 (DE) ......................................... 195 32 136
Aug. 31, 1995 (DE) ......................................... 195 32 163

(51) Int. Cl.$^7$ ................................................. F02D 7/00
(52) U.S. Cl. ..................... 290/40 C; 74/731.1; 123/399
(58) Field of Search ............................ 290/40 R, 40 A, 290/40 B, 40 C, 40 F; 74/731.1, 732.1; 123/331, 399

(56) References Cited

U.S. PATENT DOCUMENTS

| | | | |
|---|---|---|---|
| 5,056,487 A | 10/1991 | Yamakado | ................. 123/436 |
| 5,921,149 A | 7/1999 | Masberg et al. | ............... 74/574 |
| 5,979,404 A | * 11/1999 | Minowa et al. | ............. 123/399 |
| 6,085,723 A | * 7/2000 | Pels et al. | ................. 123/192.1 |
| 6,138,629 A | * 10/2000 | Masberg et al. | ......... 123/192.1 |
| 6,202,776 B1 | * 3/2001 | Masberg et al. | ........... 180/65.2 |
| 6,272,950 B1 | * 8/2001 | Braun et al. | ................ 74/731.1 |
| 2001/0039230 A1 | * 11/2001 | Severinsky et al. | ............ 477/3 |

* cited by examiner

*Primary Examiner*—Nicholas Ponomarenko
(74) *Attorney, Agent, or Firm*—Blakely, Sokoloff, Taylor & Zafman

(57) ABSTRACT

The invention concerns a drive system with a drive motor (1), especially an internal combustion engine of a motor vehicle, and a drive train (27); an electric machine (26), which can apply a braking and/or driving torque to the drive motor (1) and/or drive train (27) and/or form a coupling in the drive train (27); and an open-loop/closed-loop control system, which controls/regulates the electric machine such that it diminishes drive train torque and/or speed fluctuations. Moreover, the invention concerns a method for operating such a machine (26) in a drive system, wherein a drive train time function of the torque and/or speed is controlled/regulated, and in particular smoothed out, with the steps a) detection of the drive train torque and/or a rotary speed of the drive train (27) and/or a quantity derived from these quantities (Step A); b) determination of the torque and/or speed fluctuations (Step B); c) actuation of the electric machine 26 so that it diminishes the torque and/or speed fluctuations (Step C).

7 Claims, 5 Drawing Sheets

DRIVE SYSTEM, ELECTRIC MACHINE FOR USE IN A DRIVE SYSTEM, AND METHOD FOR OPERATING AN ELECTRIC MACHINE IN A DRIVE SYSTEM

This application is a continuation of application Ser. No. 09/043,686 filed Feb. 27, 1998 which was the U.S. National phase application corresponding to PCT application No. PCT/DE96/01664 filed Aug. 31, 1996 claiming priority to German Patent Application Nos. 195 32 163.4, 195 32 139.9 and 192 32 136.7 all of which were filed on Aug. 31, 1995 and is hereby incorporated by reference.

BACKGROUND OF THE INVENTION

1. Field of the Invention

The present invention relates to drive systems.

2. Description of the Related Art

In general, torque fluctuations also lead to fluctuations in rotary speed. Both the torque fluctuations and the rotary speed fluctuations affect the motor vehicle and its driving performance in various ways. In particular, these fluctuations cause an impairment of driving safety, driving comfort, and wear on parts, or they necessitate a larger dimensioning of these parts because of the heightened vulnerability to wear and tear of parts under fluctuating strain.

Specifically, the impairment of driving safety results from the fact that rotary speed fluctuations in the drive train result in fluctuations in the vehicle's velocity. These velocity fluctuations lead to "bucking" (longitudinal accelerations and decelerations) of the vehicle. Torque fluctuations can lead to pitching of the vehicle about its transverse axis. Both effects can impair the track stability of the vehicle as a result of the forces and moments associated with the fluctuations. In particular, these effects, and especially the velocity fluctuations, can lead to slippage between the driving wheels and the roadway (drive slip) and, thus, prevent safe steering.

Many drivers have a tendency to "take their foot off the gas" when negotiating a curve, i.e., to throttle or intercept the fuel supply; the driver thinks that velocity reduction makes it safer to negotiate the curve. But such a load change often results in drive slip as well. Tracking may be lost, and the vehicle is pulled tangentially out of the curve. Thus, by throttling or interrupting the fuel supply, the driver has created a dangerous situation—instead of placing the vehicle in a safer condition.

Most passengers perceive the effects of "bucking," "rocking" and "pitching" of the vehicle as a disturbance and, thus, as impairing the driving comfort.

The ongoing stressing of parts with changing forces and torques leads to premature material fatigue, e.g., fatigue fracture. This is a disadvantage, since premature wear not only produces higher repair costs, but also detracts from the overall vehicle reliability. Moreover, failure of parts in the drive region and drive train—because of the generally associated failure of the overall drive—is a safety risk, especially in critical driving situations, such as passing or entering a heavy traffic intersection.

Finally, the wear associated with such torque fluctuations requires a larger dimensioning of various parts in the drive system or drive train. Not only does this make the vehicle more expensive, it also increases its weight. And heavier weight is a disadvantage, due to greater fuel consumption.

In the state of the art, it is known how to counteract load change oscillations by controlling the internal combustion engine such that the load change transition (the transition from one torque level to another) is more gentle. But since the control of the internal combustion engine is relatively imprecise and sluggish, and the size of the moments of the engine is limited and thus often not sufficient, this method of reducing torque fluctuations by controlling the engine is only of limited use.

The invention concerns a drive system with a drive engine, in particular, an internal combustion engine of a motor vehicle, and a drive train. Moreover, the invention concerns an electric machine for use in such a drive system. Furthermore, the invention concerns a method for operating such a machine in such a drive system.

In motor vehicles, various torque fluctuations occur in the drive train—including, in particular, drive transmission, articulated and axle shafts and also in part crankshafts. Such torque fluctuations occur when the torque put out by a drive engine of the motor vehicle is superimposed on another torque. This additional torque arises from the drive system of the motor vehicle itself and/or arrives from the outside in the drive system. Accordingly, there is a resultant torque in the drive train, which is often subject to so-called drive train torque fluctuations. One example of a torque arising from the drive system itself are load alternation oscillations (periodic fluctuations of the torque due to a load change); an example of torques arriving in the drive system from the outside are torques which get into the drive system through effects on a drive wheel, for example, when the vehicle is traveling on a rough roadway.

By fluctuation is meant, in connection with the invention, a deviation from a mean value. This includes both periodic and nonperiodic, in particular, onetime deviations.

SUMMARY OF THE INVENTION

An improved drive system and method of operating the improved drive system with the improved drive system comprising at least one drive motor such as an internal combustion engine of a motor vehicle, and a drive train (27), at least one electric machine (26), which can apply a braking and/or driving torque to the drive motor (1) and/or drive train (27) and/or form a coupling in the drive train (27); and at least one open-loop/closed-loop control system, which controls/regulates the electric machine (26) such that it diminishes the drive train torque and/or speed fluctuations.

BRIEF DESCRIPTION OF THE DRAWINGS

The invention shall now be explained more closely by means of sample embodiments and the enclosed schematic drawing, which shows.

In the figures, parts of equal function basically have the same reference numbers. Moreover, in the entire present description, numbers indicated as "x" shall be understood as meaning at least "x" and only preferably as meaning precisely "x."

DETAILED DESCRIPTION OF THE EMBODIMENTS

Figure 1:
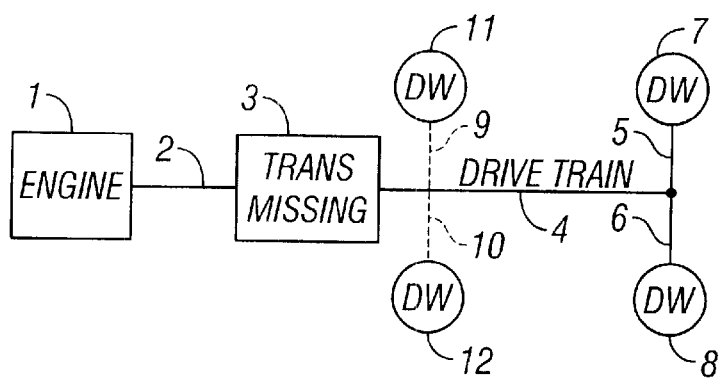
FIG. 1 is a schematic representation of a drive system.

The invention aims at providing an improved drive system.

The invention accomplishes this goal by the subject of Claim 1. According to this, the invented drive system comprises at least one drive motor, in particular, an internal combustion engine of a motor vehicle, and a drive train; at least one electric machine, which can apply a braking and/or driving torque to the drive motor and/or drive train, and/or which forms a coupling in the drive train; and at least one open-loop/closed-loop control system, which controls/regulates the electric machine such that it reduces the drive train torque and/or rotary speed fluctuations.

Moreover, the invention accomplishes the goal by the use of an electric machine in such a drive system, wherein the electric machine can apply a braking and/or driving torque to a drive motor and/or drive train and/or form a coupling in the drive train (Claim 10).

Finally, the invention accomplishes the goal also by a method of operating such an electric machine in such a drive system, wherein the time curve of the drive train torque is controlled/regulated by the machine, in particular, smoothed out, with the following steps: Detection of the drive train torque and/or a rotary speed of the drive train and/or a quantity derived from these quantities; determination of the torque and/or rotary speed fluctuations; actuation of the electric machine so that it reduces the torque and/or rotary speed fluctuations, in particular, by exerting a torque on the drive train of the braking and/or driving electric machine and/or by altering a coupling slip of the electric machine functioning as a coupling (Claim 11).

Essentially, the invention covers any type of electric machine—for example, direct current, alternating current, rotary-current asynchronous, rotary-current synchronous, or linear machines—which can produce a suitable torque. Especially favorable is a rotary-field machine in asynchronous [induction] or synchronous design, whose rotor is a squirrel-cage rotor or a rotor with distinct magnetic poles. By "rotary-field machine"—in contrast to a commutator machine—is meant in particular a noncommutator machine, in which a magnetic rotary field occurs, which preferably sweeps through 360°. The squirrel-cage rotor of the induction machine can be, for example, a hollow cage rotor with cage bars in the axial direction. In other configurations, the rotor has windings which can be externally short-circuited by slip rings. The distinct magnetic poles of the rotor in the synchronous machine are accomplished, for example, by permanent magnets or, preferably, by electromagnets, which can be supplied with excitation current by slip rings, for example.

The electric machine can also in theory be any type of machine for rotational movements. In particular, it can be operated as an electric motor and/or generator.

An invertor can generate the voltages and/or currents needed for the magnetic fields with freely selectable (within certain limits) frequency, amplitude and/or phase.

The electric machine, in particular, can be built in two different ways and thus operate differently:

1. On the one hand, the electric machine can be firmly joined by its stator to a nonrotating part, e.g., the engine housing, the transmission housing, or the chassis. The rotor of the electric machine is either connected to the drive train or a part of the drive train or is directly connected to the crankshaft or part of the drive motor.

2. On the other hand, the electric machine can act as a coupling, in that the drive train, e.g., the drive shaft, or even the crankshaft is interrupted by the machine. The interruption produces two segments in the drive train, one segment being connected to the rotor and the other segment to the stator. If the electric machine produces a suitable torque, one has a quasirigid coupling between the two shaft segments. An additional mechanical coupling produces a mechanical interlocking of this connection. If the electric machine produces another torque, especially one differing from the drive motors torque, a so-called "coupling slip" occurs, i.e., the two shaft segments run at different rotary speed. In this alternative, the power supply to the stator winding comes preferably from slip rings.

These two different designs of the electric machine shall be conceptually distinguished from each other hereafter. The first design shall be termed an "electric machine with stationary stator," the second as "electric machine with coupling function."

The variant of electric machine with stationary stator can apply a braking or driving torque to the drive train, e.g., the drive shaft, or the drive motor, e.g., the crankshaft, without having to interrupt the connection between drive motor and driving wheels by the electric machine. Therefore, the electric machine with stationary stator adds a (positive or negative) torque to the drive train or the drive motor. Thus, the electric machine acts in parallel with the drive motor on the driving wheels.

The electric machine with coupling function, on the other hand, is fundamentally a mechanical series circuit between the drive motor and the electric machine. This variant makes it possible to interdict or reduce a transfer of moment in the drive train in that the electric motor enables slippage, so that "stator" and rotor run at different rotary speeds. The electric machine with coupling function is therefore essentially a passive element, since it cannot in theory increase the torque exerted on the driving wheels of the vehicle. In any case, this statement holds only for noninertial elements of the system. In general, however, the individual parts of the drive system constitute inertial masses, so that an electric machine with coupling function can produce a torque acting on the drive wheels at least transiently.

The drive system according to the invention has an open-loop or a closed-loop control. When operating the drive system with an open-loop control, a precise knowledge of the behavior of the (overall) drive system is necessary in order to provide suitable laws of control. But in order to preclude the influence of unpredictable disturbances and changes in parameters, a regulatory circuit, or closed-loop control system, is also necessary. With a closed-loop control, torque and/or rotary speed fluctuations can usually be counteracted more precisely.

The open-loop or closed-loop control furnishes the electric machine a signal which causes it to produce a particular torque. In the case of the electric machine with stationary stator, this torque acts as a braking or driving torque on the drive train. In the case of the electric machine with coupling function, the torque provides the coupling slip. The open-loop or closed-loop control in this way can diminish or entirely eliminate torque or rotary speed fluctuations in the drive train.

The invention accomplishes the following benefits in particular:

- reduced or eliminated torque and/or rotary speed fluctuations in the drive train;
- increased-driving safety by avoidance of suddenly occurring torques in the drive system;
- enhanced driving comfort by elimination of bucking and rocking of the vehicle;
- less wear and tear;
- parts can be designed with smaller dimensions—thus saving on weight;
- improved vehicle reliability;
- fewer repair costs;
- less danger of accident from damage in the drive system of the vehicle.

Preferably, the open-loop or closed-loop control system is designed such that it diminishes fluctuations and/or oscillations of the driving torque arising, in particular, from torsions in the drive train, during or after load changes (Claim 2). Such load changes can occur during sudden acceleration, but also during interruption or abrupt throttling of the fuel supply. Likewise, a change in steepness of the roadway results in a load change. These load changes cause the drive train, especially the drive shaft, to twist or—in other words—to become "wound up" like a torsion spring as a result of torque changes—accompanying the load changes.

Such a torsion in the drive train causes the drive train at first to take up torsional energy. In this way, a torque generated by the drive motor is transmitted incompletely to the driving wheels. The torque generated by the drive motor is thus reduced—according to the torsional energy taken up. The torsional energy stored in the drive train then exerts a torque on the driving wheels and/or the drive motor. In this way, the drive train constitutes an oscillatory system consisting of two energy accumulators—one for rotational and one for torsional energy. This system can convert the two forms of energy, namely, rotational and torsional energy, into each other. Because of this property, torsional oscillations can occur in the drive train. These torsional oscillations manifest themselves, on the one hand, through fluctuations in the rotary speed of the drive train and, on the other, through fluctuations in the torque of the drive train.

The drive system is capable of dampening these fluctuations, and the dampening can be more or less pronounced. When the dampening is weak, the fluctuations are merely reduced. Even so, the fundamental effect of overshooting remains in the time curve of the torque and/or rotary speed. With strong dampening, the time curve of the torque and/or rotary speed exhibits no overshooting at all. Strong dampening reduces the maximum acceleration of the vehicle and therefore produces a quiet ride. There are neither abrupt accelerations of the vehicle nor "bucking." The riding characteristic is distinctly comfortable.

Another type of dampening consists in making use of a first overshooting in the time curve of the torque after a load change has occurred ("stepping on the gas") and only then dampening the oscillation. The acceleration is then very large at the instant of the load change, resulting in a sporty ride characteristic.

Preferably, the open-loop or closed-loop control is designed such that it diminishes torque fluctuations introduced into the drive train by at least one driving wheel (Claim 3). Therefore, the drive system not only counteracts torque fluctuations occurring within the drive train, e.g., from load changes, but also torque fluctuations caused by a torque introduced from outside the drive train. In particular, such torque fluctuations can be caused by "external moment pushes."

For example, a pothole in the roadway can be the cause of an external moment push. Potholes have various effects:

A first effect when driving over a pothole (with only one driving wheel) is that the path traveled by the wheel is lengthened. However, the vehicle itself changes its velocity little if at all, because of its large inertial mass. The wheel rolling over the pothole experiences an instantaneous acceleration. This acceleration leads to a torque in the drive shaft and, thus, a moment push, coming more or less from the road. Upon coming out of the pothole, the wheel is again decelerated to its speed before driving through the pothole. It therefore experiences a negative acceleration.

A second effect is that the wheel axle performs an angular movement when driving through a pothole. But this angular movement, especially with universal joints, can result in a torque on the drive shaft. For example, a change in the angle of the shaft segments connected by the universal joint can result in a rotation of at least one of the two shaft segments. This will also produce a brief torque (moment push) in the drive train.

Another moment push introduced from outside the drive train occurs upon change in the road cover. In particular, the drive slip can change abruptly with change in the coefficient of friction of the road cover, e.g., a transition from snow to solid cover. The abrupt change in drive slip leads to a moment push, specifically, in the case of snow/solid cover, a moment push braking the drive train.

The drive system according to the invention can also diminish or entirely eliminate these "external moment pushes" produced by the road cover, since it buttresses the electric machine against a housing (e.g., that of the engine, transmission) or since the electric machine with coupling function enables a coupling slip.

It is especially preferable to design the open-loop or closed-loop control such that, in order to diminish the torque and/or rotary speed fluctuations, it causes the braking and/or driving electric machine to introduce torques into the drive train that are correlated with these fluctuations, in particular, directed opposite or concurrently with them (Claim 4). In this variant, the electric machine in the design of "electric machine with stationary stator" generates a driving or braking torque acting on the drive train, depending on the fluctuations, and this torque can be directed either opposite to or concurrent with the fluctuations.

On the other hand, the electric machine takes load off of the drive train by applying a concurrent torque in the area between the electric machine and the point of action of the moment which is causing the fluctuation, e.g., on a driving wheel. By applying an opposite torque, the drive train will be relieved in the other area, on the other side from the electric machine, e.g., between electric machine and drive motor.

Preferably, the open-loop/closed-loop control is designed such that, in order to reduce the torque and/or rotary speed fluctuations, it causes the electric machine acting as a coupling to furnish coupling slip levels correlated with these fluctuations (Claim 5). This variant makes it possible, by regulating the slip (difference between rotary velocities) between stator and rotor—i.e., the so-called coupling slip—to vary the torque transmitted by the drive train. Assuming a noninertial drive system, in particular, a noninertial drive train and drive motor, this variant can only reduce, but not increase the torque transmitted. Yet this model does not exactly correspond to reality. In actuality, all elements of the drive system, especially the drive train and the drive motor, have inertial masses. Therefore, the electric machine can support itself against the inertial masses and apply a torque to the shaft segments joined by rotor and stator. Thus, the electric machine with coupling function can also increase the torque transmitted. If an increase occurs in the torque of the drive train, the electric machine can reduce the torque transmitted by increasing the coupling slip. If a drop in the thrust of the drive train occurs, the electric machine—thanks to the inertial masses of the drive system—can generate an additional torque (at least temporarily). Using both measures—alone or in combination—the electric machine can smooth out the time curve of the drive train torque.

Preferably, the open-loop or closed-loop control is connected to a sensor, especially a torque metering hub, which can detect a torque in the drive train (Claim 6). By means of a sensor, the open-loop or closed-loop control system detects a suitable quantity from which it can determine the torque and/or rotary speed fluctuations in the drive train. The sensor can be a torque measuring hub, a magnetoelastic load measuring pin, or a sensor based on the eddy current principle, e.g., an eddy current torsion sensor. These sensors can be accommodated inside the drive train, but also inside the drive motor, especially in/on the crankshaft.

Especially preferably, the open-loop or closed-loop control is connected to a sensor which can detect a rotary speed of the drive train (Claim 7). The measured rotary speed is either the rotary speed of the drive, transmission, articulated or crank shafts or one or more axle shafts. The open-loop or closed-loop control can also detect several of these rotary speeds and be used as a control or regulation signal for the electric machine. These rotary speeds are preferably detected with inductive sensors and/or Hall sensors.

Measurement of the rotary speed of the drive train is equally important, since fluctuations in this speed impair the driving performance. The open-loop control system determines the rotary speed with the sensor and from this the rotary speed fluctuation, in order to obtain a uniform rotary speed trend by applying a suitable torque or a suitable coupling slip.

If the behavior of the overall drive system is known, the open-loop control can also determine the torque in the drive train from the rotary speed and thus also torque fluctuations. The rotary speed can therefore sometimes be a suitable quantity for determining the torque or torque fluctuations.

Preferably, the amount of dampening of the dampening electric machine can be controlled or regulated, especially in event of a load change or some other change in the torque and/or rotary speed of the drive train in order to ensure a rapid transition from one torque or speed level to another with no overshooting, or at most one or a few overshoots in the time curve of the torque, and with little time-averaged dampening (Claim 8). As already described above, the electric machine can have dampening action in order to reduce fluctuations. Usually, a dampening in an oscillatory system occurs with a constant degree of dampening. The electric machine, however, through a suitable open-loop or closed-loop control, opens up the possibility of altering this degree of dampening, even within the fluctuation of torque or rotary speed. The degree of dampening can itself be a controlled or regulated quantity, i.e., the degree of dampening can be altered as a function of the torque fluctuations.

The electric machine is preferably situated in the starting region, in the middle region, or in the end region of the drive train (Claim 9).

"Starting region" designates the region near the point where the drive motor introduces the drive torque into the drive train. Thus, the electric machine is situated, e.g., in the region of the drive motor, especially between drive motor and transmission, or at the other side of the drive motor, i.e., on the free end of the crankshaft.

"End region" designates the region near the point where drive moments from the drive train are introduced into the surroundings, e.g., onto the road. Thus, the electric machine is situated in the region of a driving wheel.

"Middle region" means the region between starting and end region. Thus, the electric machine can be situated, for example, in the region of the transmission or a differential.

These different versions enable different effects: If the electric machine is situated in the starting region of the drive train, i.e., near the drive motor, it can reduce or prevent torsions in the drive train upon load change by restraining the change in the torque acting on the drive train. When a moment push is introduced from the road, the electric machine with stationary stator can prevent the moment push from getting into the engine interior, especially the crankshaft, for example, because the electric machine buttresses the moment push against the engine housing.

The same holds for the transmission. If the electric machine is arranged on the transmission, specifically, between transmission and drive train, the electric machine can buttress moment pushes "from the road" against the transmission housing, without these moment pushes getting inside the transmission (in this case, the moment pushes also do not get into the drive motor).

If the electric machine acts as a coupling and is situated near the engine, a coupling slip regulation can reduce the torsional oscillation in the drive train and cut off moment pushes from the road.

If, on the other hand, the electric machine with stationary stator is situated in the end region of the drive train, especially in the region of the driving wheels, it cannot prevent the torsional oscillation effect in the drive train upon (sudden) load change. However, it can reduce fluctuations in the drive torque (the torque acting on the driving wheels). If moment pushes "from the road" occur, the electric machine with stationary stator situated in the end region of the drive train can take strain off the overall drive train by buttressing the torque against the vehicle's body.

If the electric machine situated in the end region is an electric machine with coupling function, the electric machine will increase the coupling slip—upon occurrence of a moment push from the road—such that there only results an acceleration of the driving wheel, but no accelerating moments are introduced into the drive train.

After informative quantities have been detected in Step A, the open-loop or closed-loop control determines the fluctuations of the torque and/or the rotary speed in Step B. In the case of open-loop control (without feedback circuit), the electric machine can be actuated in Step C so that it exerts a suitable torque on the drive train or alters the coupling slip of the electric machine with coupling function. This is done by looking up suitable values from a table as a function of the fluctuation levels determined. Such an open-loop control is an easier version to construct, since one can dispense with the feedback circuit.

If instead of an open-loop control one uses a genuine closed-loop control (with feedback circuit), it is possible to regulate the controlled quantity, namely, torque or speed, such that unpredictable disturbances can also be detected and eliminated.

It has been shown how, through the installation of an electric machine in a drive system of a motor vehicle, fluctuations in the drive train torque or in the rotary speed of the drive train can be diminished or even entirely eliminated in many different ways. Thus, the invention achieves important improvements, especially in the area of driving safety and driving comfort.

FIG. 1 illustrates the basic layout of a drive system of a motor vehicle. An internal combustion engine 1 is connected via a shaft 2 to a transmission 3. The transmission 3 is connected by a drive shaft 4 to axles 5 and 6 of driving wheels 7 and 8. These elements 1–8 are basically implemented in all vehicles with two driven wheels. However, the invention is also applicable in vehicles with a different number of driven wheels, including only one driven wheel, but especially also vehicles with all-wheel drive. A corresponding all-wheel drive vehicle is indicated in FIG. 1 by the broken-line axles 9 and 10 connected to the drive shaft 4, which are joined to two other drive wheels 11 and 12. All elements of this drive system, which viewed functionally lie between the internal combustion engine and the drive wheels, form the drive train, including in particular the connection shaft 2, the drive shaft 4, and the axles 5, 6, 9 and 10. Moreover, the crankshaft of the internal combustion engine, not shown, is also counted as part of the drive train. Finally, the transmission also has shafts which transmit torques from the internal combustion engine to the drive wheels. These shafts are also counted as part of the drive train.

Figure 2:
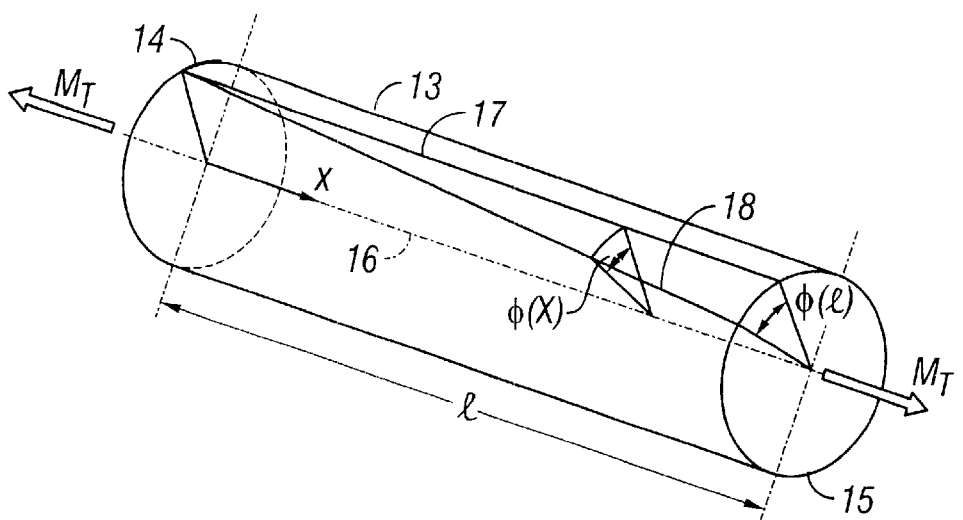
FIG. 2 is a schematic representation of a shaft segment to illustrate the torsion effect.

FIG. 2 illustrates the turning of one of the shafts or axles in the drive train or is to be considered as a theoretical "substitute diagram" of a portion or the whole of the drive train. A substitute shaft 13 receives oppositely directed moments $M_T$ at both ends 14 and 15. This torsional moment $M_T$ turns the shaft through a torsion angle $\phi(1)$ for a length l. Along the x coordinate, the substitute shaft 13 turns through the angle $\phi(x)$. In FIG. 2, $\phi(x)$ is proportional to x. One notices this relationship of FIG. 2 from the fact that the line 17 parallel to the axis in the substitute shaft 13 (when no moment is applied) becomes the line 18 when moment is applied, i.e., still exhibits a straight course. Such a straight course after moment is applied generally presupposes a homogeneous shaft with constant cross section. If this assumption is not fulfilled, the line 17 will no longer have a straight course after moment is applied.

The substitute shaft 13 picks up torsional energy as a result of the torsion about the torsion angle $\phi(l)$. This torsion energy is equal to the product of the moment of torsion $M_T$ and the angle of torsion $\phi(l)$. If the substitute shaft 13 is restrained at the end 14 or 15, while the other end 15 or 14 is free, the substitute shaft 13—after having taken up torsional energy—will execute a free rotary oscillation. Torsional energy will be transformed into kinetic energy, namely, energy of rotation. After this first transformation, a second transformation occurs. Now, energy of rotation is transformed into torsional energy. These transformation processes repeat periodically, infinitely often in the case of no losses. The result is a rotary oscillation of the substitute shaft. In the real situation, however, the oscillation is dampened by friction, and a portion of the energy is transformed into heat.

Figure 3:
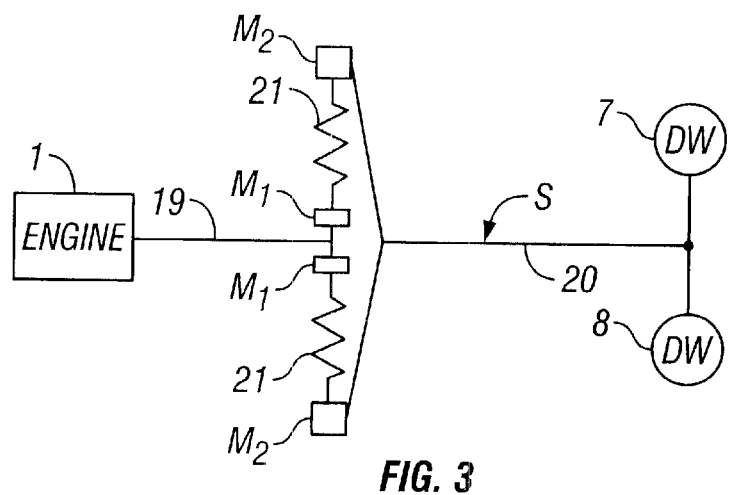
FIG. 3 is a model representation of a drive train to illustrate torsion effects.

FIG. 3 shows schematically the drive system of a motor vehicle susceptible to torsion. The transmission 3 is not shown, for reasons of simplicity. Moreover, only two drive wheels 7, 8 have been represented. The arrangement of the internal combustion engine 1 up to the drive wheels 7, 8 represents the overall drive system capable of torsion and oscillation. It is represented by two shaft segments 19 and 20, as well as a model representation of inert masses m1 and m2. The mass m1 represents all masses of the shaft segment 19, the mass m2 those of the shaft segment 20. The two shaft segments 19, 20 in this model are joined to springs 21. These springs represent the torsional ability of the drive train.

When the shaft segment 19 receives torque put out by the internal combustion engine, the mass m1 takes up energy of rotation by virtue of acceleration. The springs 21 are deflected from their starting position, taking up energy. At a delay in time relative to the acceleration of the shaft 19, the forces or moments transmitted by the springs 21 create an acceleration of the other shaft segment 20 plus mass m2, and the drive wheels 7 and 8 are also accelerated.

Physically, the representations of FIG. 2 and FIG. 3 correspond to each other. The springs 21 correspond to the torsional capacity of the substitute shaft 13. The masses m1 and m2 represent the inertia of the substitute shaft 13.

Figure 4:
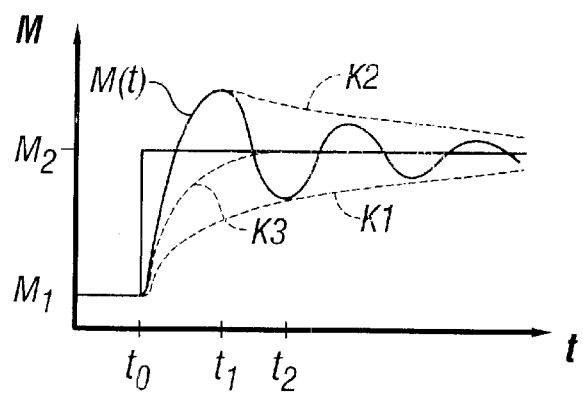
FIG. 4 is a schematic diagram of the torque in the drive train as a function of time.

FIG. 4 shows the torque transmitted by the drive train, in particular, by the shaft segment 20. The following remarks pertain to the moment or moments in a section through this shaft segment 20.

FIG. 4 illustrates the time course of the drive train torque, e.g., at point S in the shaft segment 20. Up to time $t_0$, the drive train is transmitting a first torque $M_1$. At time $t_0$, the internal combustion engine 1 produces a second, larger torque $M_2$. Because of the above-described torsions in the drive train and the associated loss-producing energy transfer events (from torsion energy to energy of rotation and back), the drive train torque function M(t) behaves like a dampened oscillation: The response of the drive system to a moment rise from the first torque $M_1$ to the second torque $M_2$ reaches its first maximum at a time $t_1$ later than the time $t_0$. But this first maximum exceeds the value of the second torque $M_2$. After reaching this first maximum, the curve M(t) falls below the value of the second torque $M_2$ and reaches a first minimum at time $t_2$. After reaching this first minimum, the oscillation of the drive train torque continues and ultimately hunts to the steady value $M_2$.

Because of these torque fluctuations in time, fluctuations also occur in the rotary speed of the drive shaft 4. The rotary speed function behaves qualitatively similar to the torque function in FIG. 4, but the time scale is different. In particular, the rotary speed reaches a maximum when the torque M(t) takes on the value $M_2$. On the contrary, the rotary speed takes on its time average value when the torque function of time reaches a maximum or minimum. This relationship between rotary speed and torque corresponds to a 90° phase shift between the two quantities. The phase shift is a result of the energy transfers of torsional energy into energy of rotation.

The oscillations of both the rotary speed and the torque have a negative impact on the driving performance of the motor vehicle and it is the purpose of the invention to moderate or compensate for these fluctuations or oscillations. However, the drive system of the invention also makes allowance for other effects, described hereafter.

Figure 5:
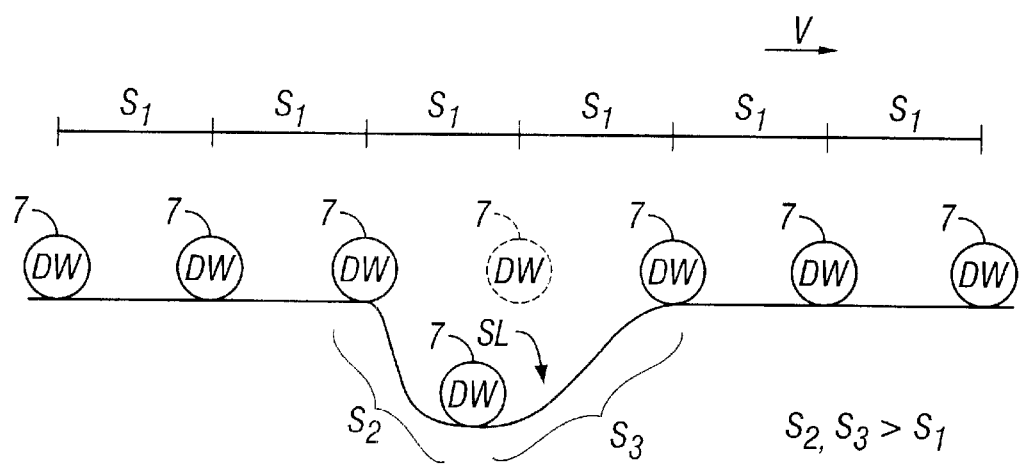
FIG. 5 is a schematic representation of a wheel driving over a pothole.

FIG. 5 shows how a drive wheel 7 rolls through a pothole SL. The other (three) wheels of the motor vehicle do not travel over this pothole SL. The vehicle (not shown) travels with basically constant velocity v. Therefore, besides the vehicle, the drive wheel 7 also covers the same distances $s_1$ in the same time intervals before and after moving over the pothole SL. But when moving over the pothole SL, the particular drive wheel 7 must travel a longer distance $s_2$, $s_3$. FIG. 5 shows in broken line above the pothole SL the drive wheel 7 in the event that no pothole is present.

On account of the pothole SL and the longer distances $s_2$, $s_3$, the drive wheel 7 is accelerated in passing over the pothole SL. The result is a torque applied to the drive wheel 7. The drive wheel 7 takes up additional energy of rotation, which is essentially removed from the kinetic energy of the vehicle. In general, this removal of energy is not noticeable, on account of the extreme mass differences between vehicle and drive wheel 7. In special situations, however, it is a disturbance. The electric machine of the invented drive system then furnishes the additional energy of rotation by conversion of electric energy, so that the vehicle does not lose any kinetic energy.

Furthermore, the axle of the particular wheel is shifted in its inclination when traveling over a pothole. Such a change in angle in a drive train with articulated shafts—which are customary in motor vehicle propulsion systems—results in an additional rotation of at least one of the shaft segments of an articulated shaft.

Figure 6:
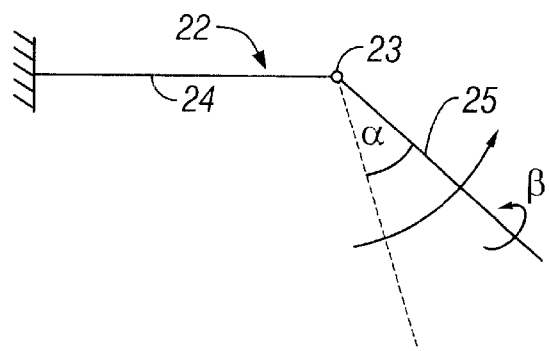
FIG. 6 is a schematic representation of a universal joint to illustrate angle-dependent shaft rotations.

FIG. 6 illustrates the principle of this rotation. An articulated shaft 22 has a joint 23 and two segments 24, 25. Segment 24—for the discussion—is locked and cannot turn. As segment 25 turns about the joint 23 through the angle $\alpha$, the segment 25 of the articulated shaft 22 performs a rotation about the angle $\beta$. This effect can be briefly described as follows: When the angle of two segments 24, 25 of an articulated shaft 22 changes, at least one segment 24 or 25 performs a rotation about its lengthwise axis.

The two effects explained by means of FIG. 5 and FIG. 6 generally result not only in a perturbing moment push, but also in a torsion in the drive train. This, in turn, manifests itself as torque fluctuations of the drive train, similar to FIG. 4.

Figure 7:
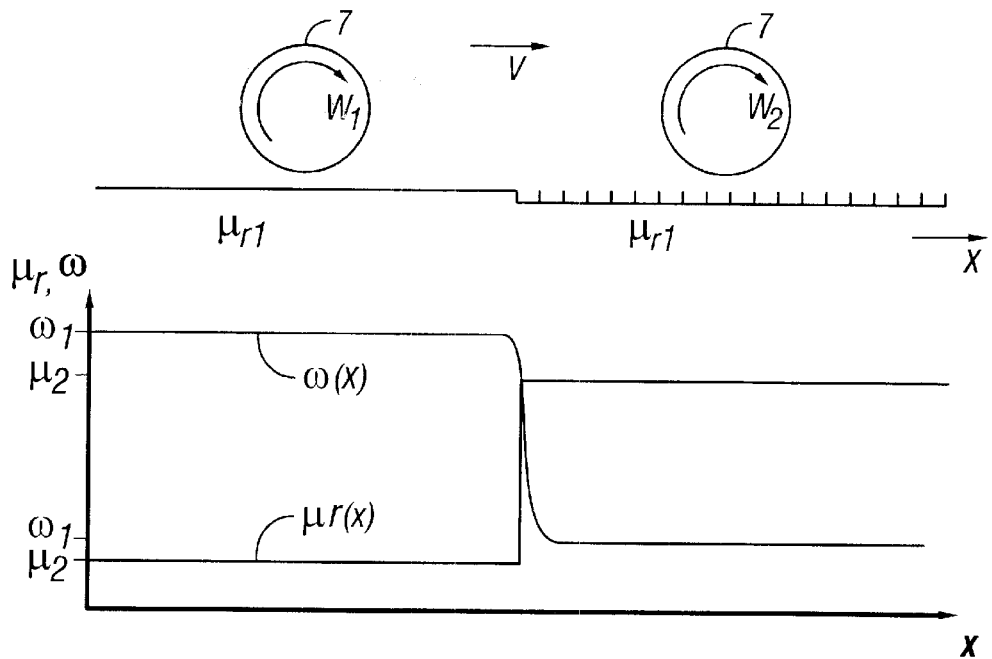
FIG. 7 is a schematic representation of the coefficient of friction and the rotational velocity of a wheel during the transition from a smooth road cover to a "gripping" one.

FIG. 7 illustrates another effect which is taken into account or mitigated by the invention. The drive wheel 7 passes from a road cover with low coefficient of friction $\mu_{r1}$ to a road cover with high coefficient of friction $\mu_{r2}$. While traveling on the road cover with the low coefficient of friction $\mu_{r1}$, the drive wheel 7 has a relatively large drive slip. Upon changing to the road cover with the high coefficient of friction $\mu_{r2}$, this slip diminishes. Since the vehicle retains its velocity v because of its inertial mass, the rotary speed of the drive wheel 7 decreases from a value $\omega 1$ to a value $\omega 2$. This transition, therefore, forces a reduction of the rotary speed of the drive wheel 7. This speed reduction is accompanied by a torque braking the drive train. This torque is more or less introduced into the drive train from the outside (from the road). Due to this braking, the energy of rotation of the drive train reaches a lower energy level. The associated energy difference is partly transformed into frictional heat between tires and roadway and partly into kinetic energy of the vehicle. Moreover, this braking torque leads to a torsion of the drive train with the result of torque oscillations, similar to FIG. 4.

Figure 8:
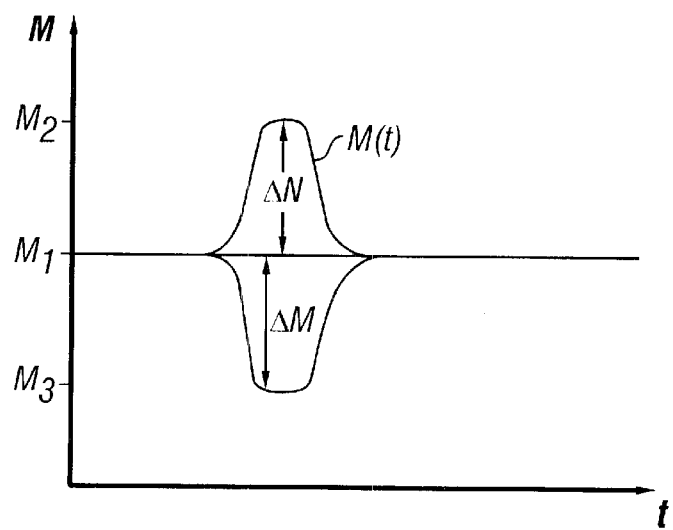
FIG. 8 is a schematic representation of the torque of the drive train as a function of time.

FIG. 8 illustrates the time course of the torque in the drive train and on the drive wheel 7 when the drive wheel 7 and the drive train are subjected to a moment push due to an effect per FIGS. 5–7. As in FIG. 4, the torque M(t) in FIG. 8 is shown as a function of the time t. Because of the moment push $\Delta M$, the torque of the drive train increases from the value $M_1$ to a value $M_2$. If the moment push $\Delta M$ is in the opposite direction, the moment $M_1$ decreases by the amount $\Delta M$ to a value $M_3$.

Such moment pushes are not only unpleasant to the passengers, but also considerably strain the structural elements and impair the driving safety. Furthermore, they are also able to "wind up" the drive train and result in torque fluctuations in the drive train (per FIG. 4).

FIGS. 9a–f show various sample embodiments of a drive system according to the invention. An electric machine 26 is provided in the drive system, in order to diminish or entirely prevent the above-described effects. This electric machine can be arranged in various locations of the drive system and thus achieve different effects.

Figure 10:
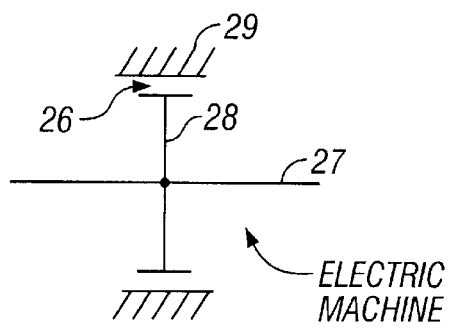
FIG. 10 is a schematic representation of an electric machine with stationary stator arranged on a drive train.
Figure 11:
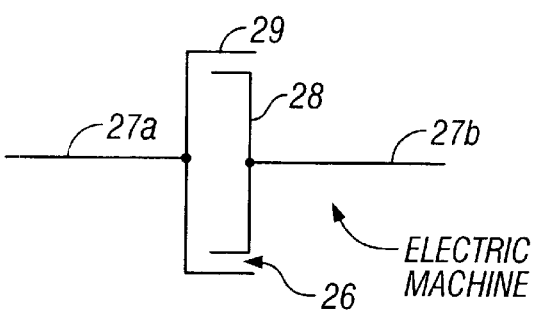
FIG. 11 is a schematic representation of an electric machine with coupling function built into the drive train.

FIG. 10 and FIG. 11 show different installation versions of the electric machine 26. FIG. 10 shows the version "electric machine with stationary stator." FIG. 11 shows the version "electric machine with coupling function."

Per FIG. 10, the rotor 28 of the electric machine 26 is fastened in one location of the drive train 27. Thus, the rotor 28 turns with the corresponding shaft segment of the drive train 27. A stationary stator 29 surrounds the rotor 28. This stator 29, for example, is secured to a housing of the internal combustion engine 1 or the transmission 3 or to the chassis of the vehicle. The stator 29 is therefore fixed relative to the rotor 28.

In the version of FIG. 11, however, the stator 29 can also rotate. Here, the stator 29 is connected to one segment 27a of the drive train, while the rotor 28 is connected to another segment 27b of the drive train. Thus, the stator 29 can also turn relative to the vehicle. The electric machine 26 controls the rotation between rotor 28 and stator 29 by a corresponding open-loop or closed-loop system. In a particular embodiment—not shown—the connection between rotor 28 and stator 29 can be mechanically interlocked. Therefore, the two shaft segments of the drive train 27 move at the same rotary speed, as in FIG. 10. If there is no mechanical interlocking, the electric machine 26 must produce a suitable moment in order to keep both shaft segments at the same rotary speed. This moment is as large as the torque transmitted by the segments 27a, 27b of the drive train.

Figure 9A:
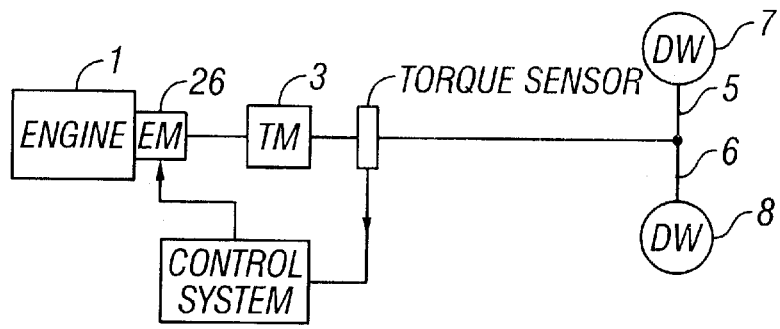
FIG. 9a–f are schematic representation of various sample embodiments of the drive system with electric machine.

FIG. 9a shows the arrangement of the electric machine 26 directly on the internal combustion engine 1. In this arrangement, the electric machine 26 can counteract load changes produced by the internal combustion engine 1 such that little or no oscillation occurs in the drive train torque (e.g., per FIG. 4). Basically, the electric machine 26 makes possible almost any desired torque function in the drive train, but especially torque functions according to curves K1, K2 or K3 in FIG. 4.

Curve K1 shows the torque function for an electric machine providing strong dampening. The dampening from the electric machine is so large that there are no longer any overshootings in the torque function. In any case, such a strong dampening leads to a reduced acceleration capability of the vehicle.

Curve K2 shows the activation of the electric machine 26 at time $t_1$ and this in such a way that it generates an additional driving torque. This raises the "valleys" within the torque oscillations, resulting in a curve with no further minima.

Curve K3 shows, as a "hybrid" of curve K1 and curve K2, another possible torque function. The electric machine 26 in this version works alternately as a generator and a motor. Specifically, it works as a generator when the curve K3 is beneath the curve M(t) and as a motor when the curve K3 is above the curve M(t). Advantageously, the system stores the electrical energy obtained during the generator mode of the electric machine 26 in an energy accumulator, e.g., in a condenser or in a so-called transient battery, and uses this energy later on to operate the electric machine 26 in the motor mode. This type of operation requires little or no energy to compensate for the torque fluctuations.

A curve per K2 is especially desirable for a sporty drive. A curve per K1 is advantageous for an especially uniform ride. Through dampening, especially per curve K1, the torsion of the drive train can be diminished and, thus, so can the torque and/or speed fluctuations within the drive train. The electric machine 26 furnishes both driving and braking torques to the drive shaft 4 in order to accomplish these tasks.

An electric machine 26 with a coupling function in the arrangement per FIG. 9a can essentially only diminish the torque in the drive train, but not increase it. This decrease is accomplished by increasing the coupling slip, i.e., the electric machine 26 enables a rotary speed difference between the shaft segment connected to the stator and the shaft segment connected to the rotor. In this way, one can achieve curves per K1 in FIG. 4. Only when large inertial masses are present can the electric machine with coupling function buttress itself against the inert masses and thereby produce a torque driving the vehicle.

If, as in FIG. 9a, the electric machine has a stationary stator, the electric machine can counteract moment pushes coming from the road, in that the electric machine during such a moment push buttresses this moment against the housing on which it is mounted. Thus, the moment push does not propagate further than the electric machine. In this way, for example, the interior of the engine can be relieved - it will be shielded against moment pushes from the road. An electric machine 26 with coupling function can also cut out moment pushes caused by the road, in that the electric machine 26 allows coupling slip and thus does not transfer the moment push in the direction of the internal combustion engine 1.

Figure 9B:
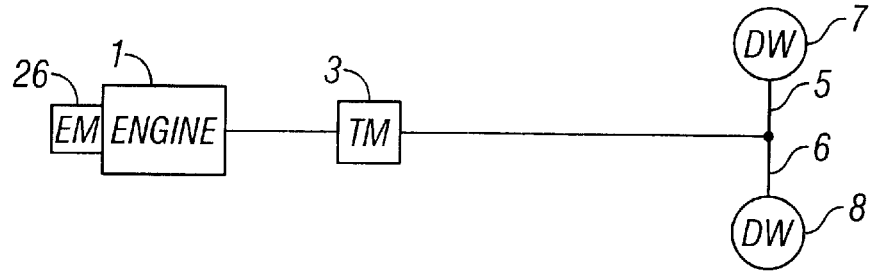

FIG. 9b sketches the arrangement of the electric machine 26 on the internal combustion engine 1, namely, on the free end of the crankshaft of the engine, i.e., on the crankshaft end that is not connected to the drive train. In this configuration, only the electric machine 26 with stationary stator 29 makes sense. This arrangement basically accomplishes the same effects as the arrangement of FIG. 9a. However, the arrangement of FIG. 9b is advantageous when there is very little room available between internal combustion engine 1 and transmission 3.

Figure 9C:
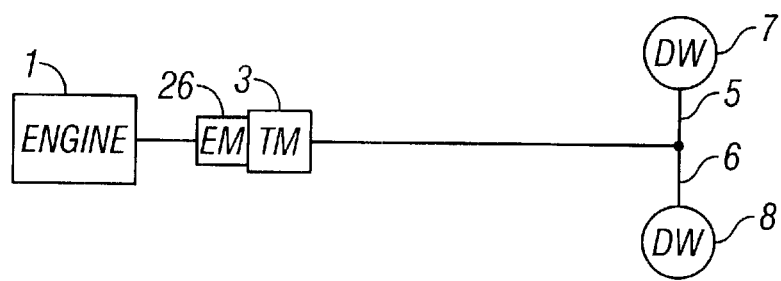
Figure 9D:
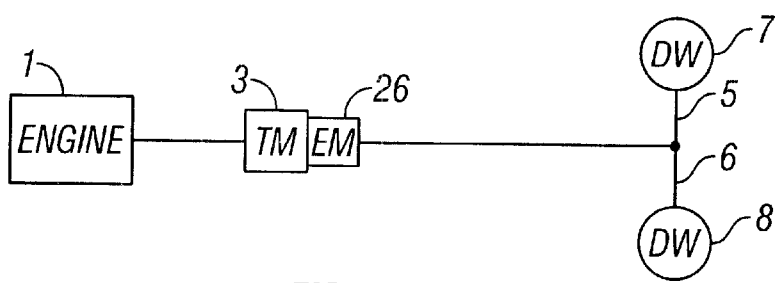

According to FIG. 9c and FIG. 9d, the electric machine 26 is arranged on the transmission 3, either between the internal combustion engine 1 and transmission 3 (per FIG. 9c) or between transmission 3 and driving wheels 7, 8 (per FIG. 9d). Since the transmission 3 is generally located near the internal combustion engine 1, these two arrangements basically have the same effects as the arrangement of FIG. 9a. In particular, both arrangements are capable of decoupling moment pushes caused by the road from the internal combustion engine 1. In both the electric machine 26 installed per FIG. 9c and that per FIG. 9d, the use of the electric machine 26 with stationary stator of FIG. 10 and the use of the electric machine 26 with coupling function of FIG. 11 is advantageous. Hence, there are four different versions of installing an electric machine 26 in the vicinity of the transmission 3, each having different effects. The effects basically correspond to those of the electric machine 26 (with stationary stator or with coupling function) arranged on the internal combustion engine per FIG. 9a.

Figure 9E:
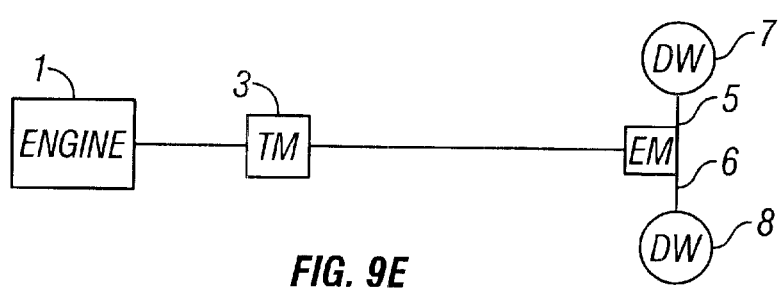

When the electric machine 26 with stationary stator is installed per FIG. 9e, namely, at the end region of the drive train, but not directly on the drive wheels 7, 8, it is not possible in theory to prevent a winding up of the drive train between internal combustion engine 1 and electric machine 26. An electric machine with coupling function in this place can substantially reduce, however, a torsion of the drive train in the region between internal combustion engine 1 and electric machine 26, since the electric machine 26 increases the clutch slip during a load change. Of course, the torque applied to the drive wheels is then reduced by a corresponding amount.

Figure 9F:
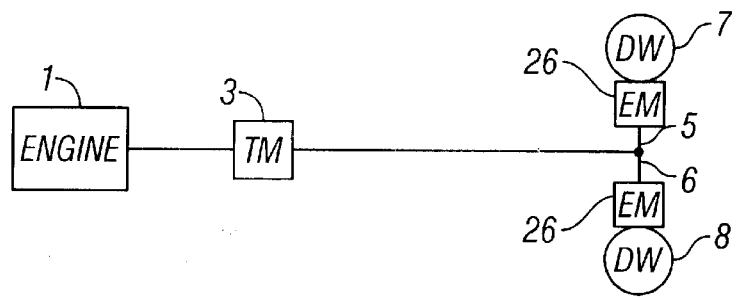

According to FIG. 9f, one electric machine 26 each is arranged on each drive wheel 7, 8. This arrangement when using an electric machine 26 with coupling function allows separating the entire drive train, including the axles 5, 6 of the drive wheels 7, 8, from the rest of the drive train. When using electric machines with stationary stator, moment pushes resulting from the road can be compensated in direct proximity to the wheels. This is advantageous because of the very short distances between electric machine 26 and dirve wheels 7, 8, since no moment pushes resulting from the road can get into the segment between electric machine 26 and engine 1. Moreover, this variant is advantageous because each drive wheel 7, 8 can be individually influenced. This is especially advantageous for poor road cover, i.e., roads with many potholes and/or different coefficients of friction.

In FIGS. 9a–f, different versions of the electric machine have been explained in detail. However, the invention does not only pertain to these versions, but also to a combination of these versions, in particular, several electric machines can be meaningfully installed in different places of the drive train according to FIGS. 9a–f.

Figure 12:
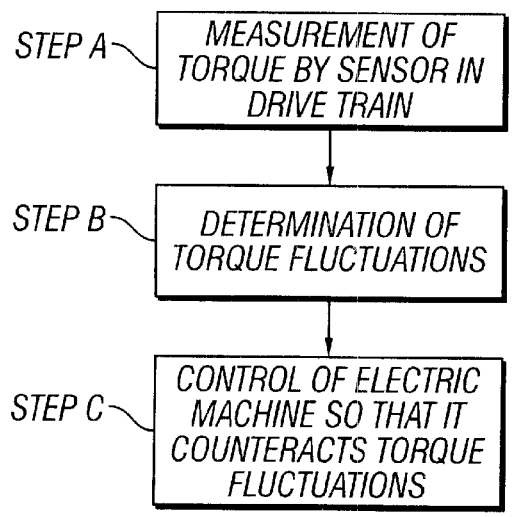
FIG. 12 is a flow chart of a method for operating an electric machine in a drive system as meaning at least "x" and only preferably as meaning precisely "x."

FIG. 12 shows a flow chart to illustrate the invented method. This method involves the open-loop or closed-loop control of the electric machine. At first, in Step A, quantities are measured which furnish information on the fluctuations of the drive train torque or the rotary speed of the drive train. This can be done either directly by measurement of torque or speed, or also by measuring quantities which stand in a relationship with them. For example, it is easy to infer the rotary speed from the angle of rotation. On the other hand, from the rotary speed and especially from changes in rotary speed, given knowledge of all system parameters, one can draw a conclusion as to the drive train torque.

What is claimed is:

1. A drive system comprising:
    at least one drive engine;
    a drive train;
    at least one electric machine which can apply at least one of positive and negative torques to the drive engine or drive train;
    a sensor for measuring the torque in the drive train; and
    a control system for determining torque fluctuations caused by load changes or moment pushes introduced from outside into the drive train by a drive wheel, based on the measurement of the torque in the drive train, and for controlling the electric machine so that it counteracts said torque fluctuations by applying at least one of the positive and negative torques correlated with these torque fluctuations.

2. A drive system according to claim 1, wherein the sensor comprises a torque metering hub.

3. A drive system according to claim 1, wherein a degree of dampening performed by the electric machine by said torque fluctuations can be regulated, in order to achieve, during a load change or another change in the drive train torque, a rapid transition from one torque level to another without or with at most one overshooting.

4. A drive system according to claim 1, wherein the electric machine is arranged in a starting region of the drive train.

5. A drive system according to claim 4, wherein the electric machine is arranged in a middle region of the drive train.

6. A drive system according to claim 4, wherein the electric machine is arranged in an end region of the drive train.

7. A method for reducing drive train torque fluctuations in a drive system, wherein the drive train's time function of the torque or rotary speed is regulated by an electric machine, the method comprising:

a) measuring torque in the drive train by a sensor for measuring the torque in the drive train;
b) determining torque fluctuations based on the torque measurement;
c) actuating the electric machine, so that this reduces the torque or speed fluctuations, by exerting at least one of a positive or negative torque on the drive train by the electric machine.

* * * * *